(12) United States Patent
Steinhauser, Jr.

(10) Patent No.: US 10,172,335 B2
(45) Date of Patent: Jan. 8, 2019

(54) ADVANCED FISHING ROD ASSEMBLY

(71) Applicant: Steinhauser LLC, Battlefield, MO (US)

(72) Inventor: Paul Martin Steinhauser, Jr., Davison, MI (US)

(73) Assignee: STEINHAUSER LLC, Springfield, MO (US)

( * ) Notice: Subject to any disclaimer, the term of this patent is extended or adjusted under 35 U.S.C. 154(b) by 129 days.

(21) Appl. No.: 14/011,394

(22) Filed: Aug. 27, 2013

(65) Prior Publication Data
US 2014/0068996 A1    Mar. 13, 2014

Related U.S. Application Data

(60) Provisional application No. 61/743,111, filed on Aug. 27, 2012.

(51) Int. Cl.
*A01K 87/00*    (2006.01)
*A01K 87/02*    (2006.01)

(52) U.S. Cl.
CPC ............ *A01K 87/02* (2013.01); *A01K 87/002* (2013.01)

(58) Field of Classification Search
CPC ..... A01K 87/00; A01K 87/002; A01K 87/007
USPC ................... 43/18.1 R, 18.1 CT, 18.1 HR
See application file for complete search history.

(56) References Cited

U.S. PATENT DOCUMENTS

| 2,334,646 | A | | 11/1943 | Prixe |
| 2,880,546 | A | * | 4/1959 | Pemberton ............. A01K 87/04 43/24 |
| 3,314,186 | A | * | 4/1967 | Viveiros ................ A01K 91/02 43/18.1 R |
| 3,447,254 | A | | 6/1969 | Sobel et al. |
| 3,618,253 | A | | 11/1971 | Edwards et al. |
| 3,727,338 | A | * | 4/1973 | Pedersen ............. A01K 87/002 403/109.5 |
| 4,121,369 | A | | 10/1978 | Lopez |
| 4,654,994 | A | | 4/1987 | Roberts, Jr. |
| 4,845,879 | A | * | 7/1989 | Urso ..................... A01K 87/00 294/24 |
| 5,241,773 | A | | 9/1993 | Burgh |
| 5,381,619 | A | | 1/1995 | Watkins |
| 5,832,653 | A | * | 11/1998 | Tsurufuji ............. A01K 87/002 43/18.1 HR |
| 5,881,489 | A | | 3/1999 | Young |
| 6,505,430 | B1 | | 1/2003 | Tsurufuji et al. |
| 6,725,595 | B1 | | 4/2004 | Chapman |
| 7,461,476 | B1 | | 12/2008 | Davis |
| 2003/0074826 | A1 | * | 4/2003 | Maguire ............. A01K 87/002 43/24 |
| 2011/0083355 | A1 | * | 4/2011 | Wilcox ................. A01K 91/08 43/27.4 |
| 2013/0152449 | A1 | | 6/2013 | Makos |

* cited by examiner

*Primary Examiner* — Thanh Pham
(74) *Attorney, Agent, or Firm* — Kutak Rock LLP; James H. Jeffries

(57) ABSTRACT

This invention relates to a hollow fishing rod assembly with an inventive mounting block that spaces a hollow rod apart from a fishing reel seat such that when the fishing reel is mounted to the seat the fishing line orifice of the reel is axially aligned with the core of the hollow fishing rod. The mounting bracket may be hinged so that the line opening of the fishing rod is moved above the fishing reel for easy access and threading of new or replacement fishing line through the rod.

7 Claims, 10 Drawing Sheets

ADVANCED FISHING ROD ASSEMBLY

BACKGROUND OF THE INVENTION

This application claims benefit of the filing date of U.S. Provisional Patent Application No. 61/743,111, filed Aug. 27, 2012.

FIELD OF THE INVENTION

The present invention relates to an improved fishing rod. More particularly, the present invention relates to a fishing rod assembly having a hollow shaft and an axially aligned fishing reel so that the fishing line passes directly through the hollow rod. An inventive mounting bracket provides substantial rigidity to the rod and is hinged to allow easy threading of the fishing line through the hollow rod.

Discussion of Background

Hollow fishing rods are well known in the industry and have been disclosed in publications and patents for decades. It is generally known that there are significant advantages to passing a line directly through a fishing rod rather than stringing the rod through ferrules mounted to the rod exterior. These advantages include a substantial reduction in ling tangling, ease of casting and the reduced rod and line entanglement during storage.

There are generally two types of line-through-rod assemblies. The first and more prevalent design includes an opening within the periphery of the hollow rod through which fishing line from a line container or reel is passed. These are "offset" line-through-rod assemblies which use a standard rod to reel orientation, for example, with a bait casting reel positioned generally above the rod. This orientation is standard because it is used with the more prevalent fishing rod design, where the line is strung exterior the rod itself, generally passing through a number of ferrules. This orientation for a line-through-rod assembly creates an angle between the fishing line dispensed from a reel and the rod. A significant drawback to this configuration is the significant increase in fishing line wear caused by line rubbing on the opening in the periphery of the rod tube. Line wear is exacerbated by the rubbing of line as it passes from the fishing reel at an angle into the hollow rod. An example of this is shown at U.S. Pat. No. 3,862,509 to Petersen. One advantage of fishing rods of this design is the ease in which a fishing line can be threaded into the hollow rod because the line opening into the rod interior is easily accessible on the periphery, or outer surface of the rod.

In order to reduce fishing line wear, several rods have been developed to align a fishing reel and the hollow rod such that the fishing line passes directly from the reel into the rod thereby decreases line friction and wear. Examples of fishing rods having this type of orientation include U.S. Pat. No. 5,381,619 to Watkins and U.S. Pat. No. 3, 618,253 to Edwards. Hollow rods that are aligned with the fishing reel do have the advantage of decreased fishing line wear but a significant disadvantage because it can be quite difficult to pass fishing line from the reel through the rod because of the close proximity of the reel to the rod. As can be seen in prior art referenced, the reel is seated in close proximity to the hollow rod opening which is necessary to limit unintended line tangling between the reel and the rod. Accordingly, when it's necessary to reintroduce the line through the rod for any reason, it can be a tedious and frustrating experience to manipulate and maneuver the line into the rod tube.

Moreover, the known axially aligned fishing rods are heavy and cumbersome, difficult and expensive to manufacture and have not been well received in the industry. Further, such rods are typically geared toward very specific uses such as deep sea fishing, surf casting and ice fishing.

Additionally, none of the axially aligned hollow fishing rods disclosed and described in prior art are believed to be manufactured or commercially available to date. By all appearances, the prior art rods have been commercial failures due to the stated limitations.

The purpose and intent of the instant invention is to provide a hollow fishing rod assembly with a reel seat for axially aligning the reel to the core of the fishing rod. An inventive mounting bracket is provided that substantially increases the rigidity and stability of the rod, substantially decreased manufacturing costs, and in one embodiment allows the rod to be hinged downward with respect to the reel seat for easy line access to the hollow core of the rod. This facilitates easy threading of line through the rod. In another embodiment of the invention, the mounting bracket includes a chamber for housing a simple line threading tool. Further, while the rod can certainly be used by anyone, it is intended specifically for young and inexperienced fishermen and fisherwomen. Ideally, the rod will be significantly shorter than traditional fishing rods so that children can easily use the device.

SUMMARY OF THE INVENTION

According to its major aspects and general design, the inventive fishing rod assembly is presented with a rod having a hollow core, a mounting bracket for securing the rod portion to a reel seat that orients the reel, when fastened to the seat to be an axial alignment with the core of the rod so that line passed linearly from the reel into the inner core of the rod. In a first embodiment the mounting bracket comprises a lightweight pair of tubes fastened together. The upper tube generally comprises the rod mounting structure and the lower tube generally comprises the reel seat mounting structure. A bridge between the upper tube and lower tube defines the distance or height between the rod and the reel seat. This bridge can be manufactured in any size to accommodate virtually any size rod and reel combination so that the line opening of the reel can always be axially aligned with the rod. Accordingly, for larger reels to be mounted to the inventive device, a larger bridge is provided between the upper and lower mounting tubes to increase the offset distance between the rod and the reel seat.

In the first embodiment, the upper tube mates to the outer periphery of a hollow rod. The rod is mounted to the upper tube in a manner generally known within the industry, such as fiberglass adhesives, braising of light metals, polymer glues and the like.

The lower tube for mounting the reel seat can be presented with or without threads. Accordingly, a reel seat can be fastened to the lower tube in a manner similar to the rod fixation to the upper tube. Many reel seats, however, may be presented with threads which are generally used in association with a moveable securing screw to fasten the reel into the reel seat. In that regard, the lower mounting tube can be provided with mateable threads so that the reel seat can easily be screwed into the lower mounting tube. In this first embodiment, the mounting bracket is rigid and the dimensions of the mounting bracket define the distance between the core of the fishing rod and the reel seat.

It is understood that the orientation of the upper tube and lower tubes of the mounting block can be reversed to accommodate an open-faced spinning reel assembly such that the reel seat is positioned above the rod core or in a generally downward and customary fashion. The mounting bracket may include a storage compartment in the lower tube for storing a small line threading tool, or other small fishing accessories. The storage compartment includes an appropriate closure that can be retained by friction or presented with threads that mate to opposing threads provided in the lower tube of the mounting bracket.

It is understood that the mounting block assembly can be manufactured from virtually any suitable material, including plastic, fiberglass, aluminum, metal alloys and composite materials.

In a second embodiment of the invention, the mounting block includes a hinged portion integral with or substantially adjacent to the bridge member. The hinge portion allows the upper mounting tube to be partially offset respective the lower mounting tube along a direction dictated by the hinge orientation. In the preferred embodiment, this hinge mechanism functions much like the breaking mechanism on a double barrel shotgun. The mechanism allows the upper mounting block tube to move generally forward with respect to the lower mounting tube thereby raising the rod opening upward above the fishing reel mounted in the fishing reel seat. This allows a user easy access to the core of the hollow fishing rod for threading replacement line through the rod. As any person familiar with the use of a rod and reel knows, it is quite common for line to break, become worn, kinked, coiled or twisted thereby requiring replacement. The inventive hinged mounting block allows easy access to the rod core for threading through replacement line. Further, the inventive mounting block may include a closeable compartment in which a line threading tool may be stored. This line threading tool may be as simple as a small weight that can be clamped onto the end of the fishing line and then dropped through the core of the hollow rod.

Accordingly, in use, when it is necessary to replace line through the rod, the hinge mechanism of the mounting block is actuated thereby moving the top tube up and away from the lower tube exposing the fishing line opening of the rod. The line is then passed through the rod, with or without the assistance of a threading tool, and when that is achieved the hinge mechanism of the mounting block is closed thereby realigning the core of the rod with the fishing reel line opening.

The hinge mechanism of the mounting block can be provided with a securing pin or other device that locks the hinge into place when not in use. This prevents inadvertent movement of the top mounting tube to the lower mounting tube as the rod is cast.

The end of rod adjacent the fishing reel can be provided with a flange or expanded collar to reduce the amount of line exposed between the reel and the rod during operation. The collar can also assist in threading replacement line into the rod.

In this second embodiment, it is preferred that the mounting block be manufactured from aluminum due to its high strength and low weight. Moreover, repeated usage of the hinge mechanism can unduly wear plastics and other light and nondurable materials.

In yet another embodiment of the inventive device, the hollow fishing rod is made from a golf club shaft, preferably a hollow graphite shaft. Because a short rod length is desirable, particularly for use by children, a graphite golf shaft is the ideal dimension for application on the inventive device. The mounting bracket can be sized to accommodate the graphite golf club shaft. Further, a golf club handle can be substituted for the standard fishing rod handle or grip. The mounting bracket can be sold to consumers and they can then finish the rod with a golf club shaft and handle of their choosing. Of course, a completed rod can be manufactured and sold for immediate use. There are cost savings and benefits associated with using golf club parts for the inventive fishing rod.

Other features and advantages of the present invention may be apparent to those skilled in the art upon a review of this patent, in light of the detailed description, claims and drawings herewith.

DETAILED DESCRIPTION OF THE INVENTION

Figure 1:
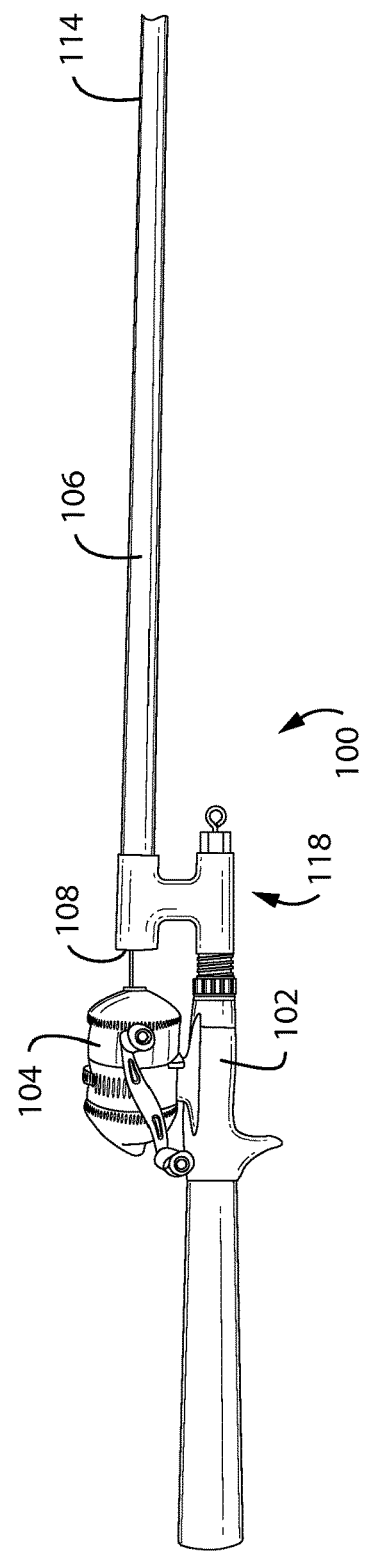
FIG. 1 is a side view of a first embodiment of the inventive fishing rod.
Figure 2:
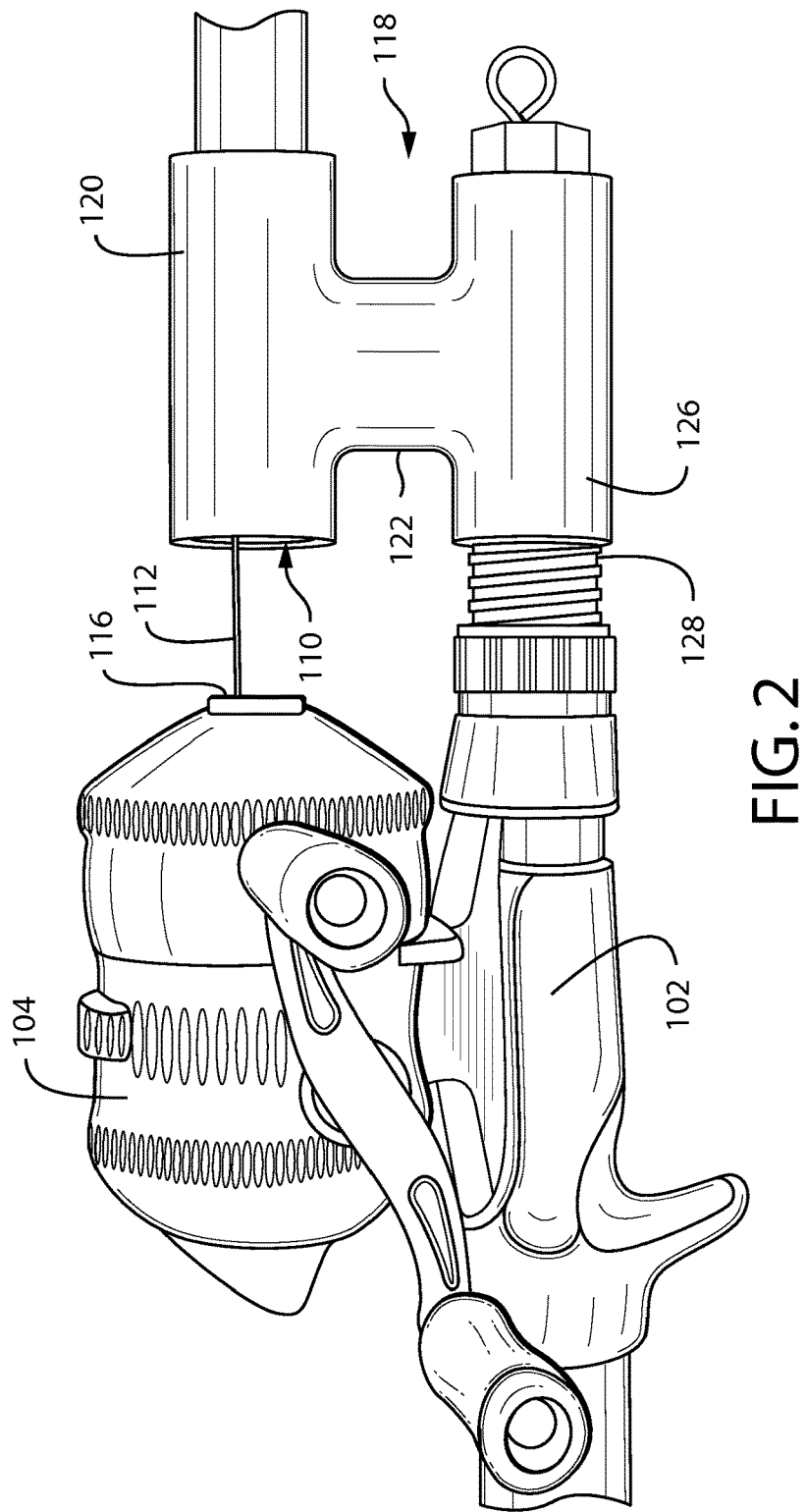
FIG. 2 is a partial side view of the first embodiment of the inventive fishing rod showing a mounting bracket.
Figure 3:
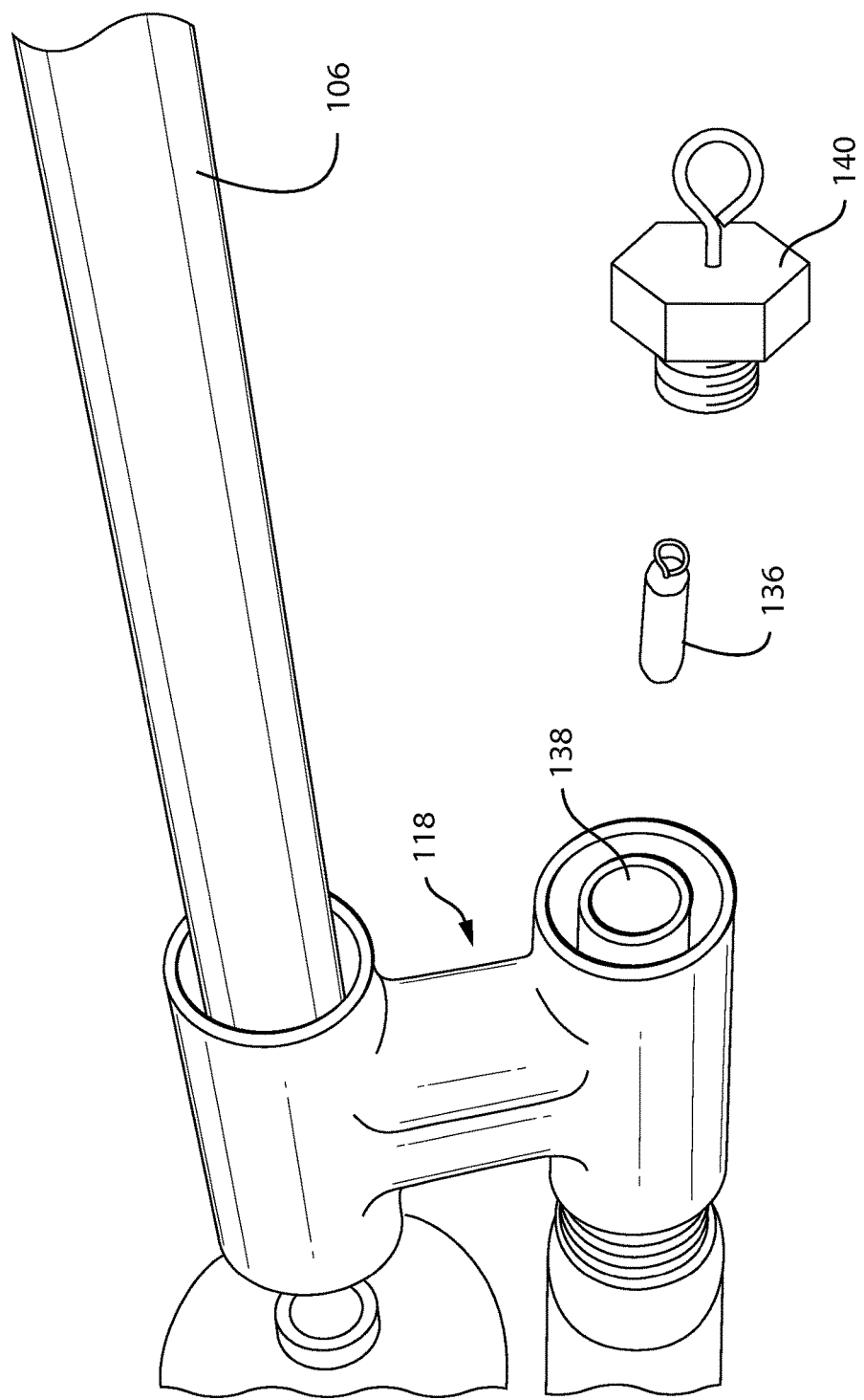
FIG. 3 is a partial exploded perspective view of the first embodiment of the inventive fishing rod showing the mounting bracket assembly.

Referring now generally to FIG. 1, the inventive device of a first embodiment is shown. The invention is a fishing rod assembly 100 that includes a reel seat 102 for mounting a fishing reel 104 and a hollow fishing rod 106. The rod 100 has a line opening 108, an inner core 110 and a line 114 exit spaced apart from the line opening 108. Fishing line 112 from the fishing reel 104 is passed through the core 110 of the hollow fishing rod 106. An inventive offset bracket 118, as best shown in FIGS. 2 and 3, includes an upper rod mounting tube 120, a bridge or middle portion of the bracket 122 and a lower reel seat mounting tube 126. The bridge 122 defines the spacing between the upper tube 120 and the lower tube 126. It is understood that the size of the bridge 122 can be changed to accommodate different rod and reel size combinations. The upper 120 and lower 126 mounting tubes may or may not be threaded to accommodate a variety of tubes and reel seats. Reel seats, such as the one shown in FIG. 2, are provided with threads 128 which are used to secure the reel 104 to the reel seat 102. Generally, the upper tube 120 would not be threaded so that a hollow fishing rod 106 can be mounted therein using an adhesive using methods common in the industry. The lower mounting tube 126 may or may not be threaded depending on the type of reel seat 102 being used. In this first embodiment the mounting bracket 122 is rigid and non-movable. When mounted in the reel seat 102, the reel 104 is generally in axial alignment with the rod 106 and specifically the line orifice 116 of the reel 104 is axially aligned with the core 110 of the rod 106 so that the fishing line 112 passes from the reel orifice 116 linearly into the core 110.

It is understood that the orientation of the upper and lower mounting tubes can be reversed to accommodate a bait casting reel in first orientation and upon reversing the orientation an open-face spinning reel which depends generally downward below the reel seat. The bracket 122 may include a storage compartment 138, as shown in FIG. 3, in which a line threading tool 136 may be stored. A closure 140 for the storage compartment 138 is provided. In use, the line threading tool 136 is tied onto the loose end of fishing line 112 and then dropped into the core 110 of the rod 106. The weight of the threading tool 136 pulls the line through the hollow rod 106.

Figure 4:
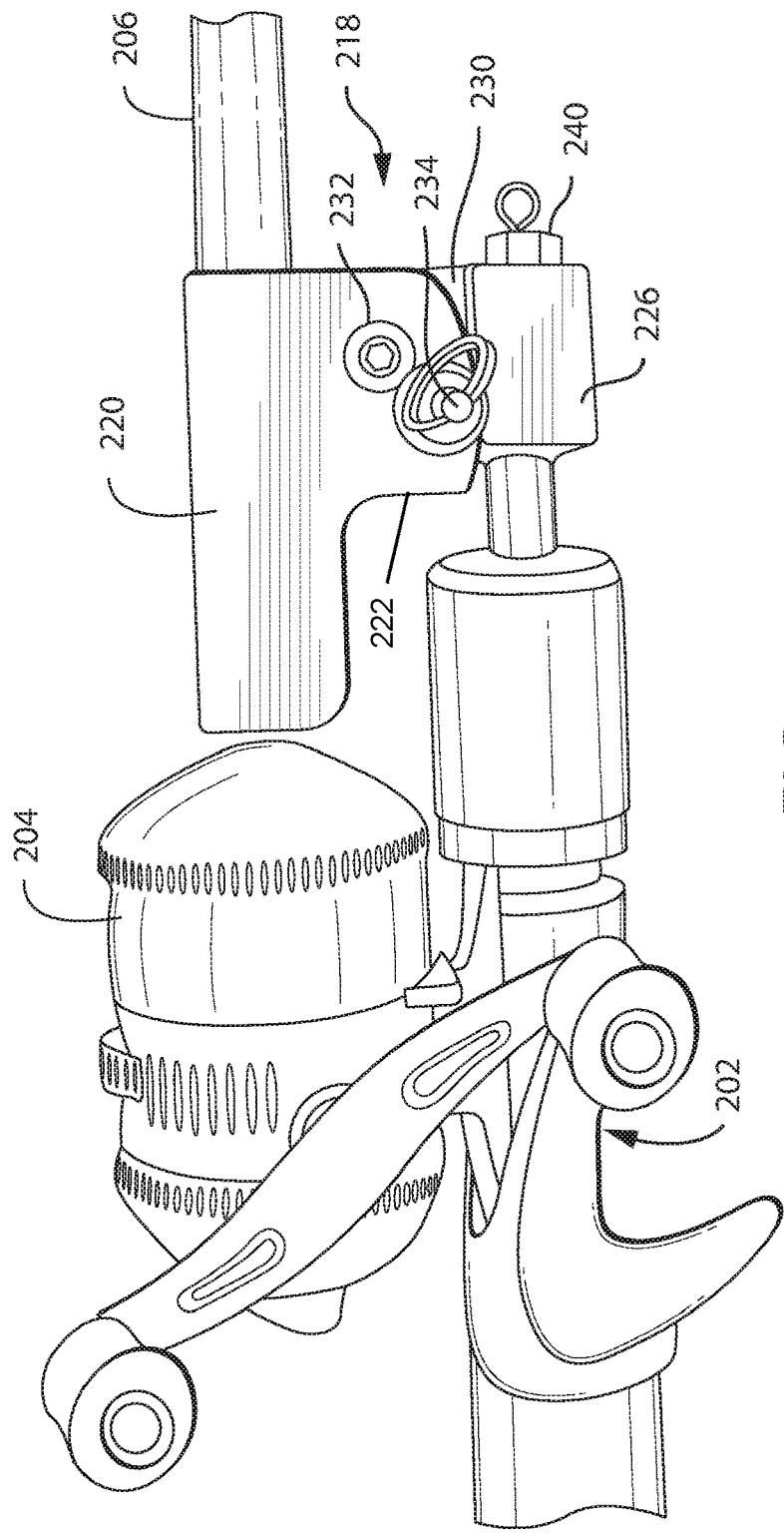
FIG. 4 is a partial side view of a second embodiment of the inventive fishing rod.
Figure 5:
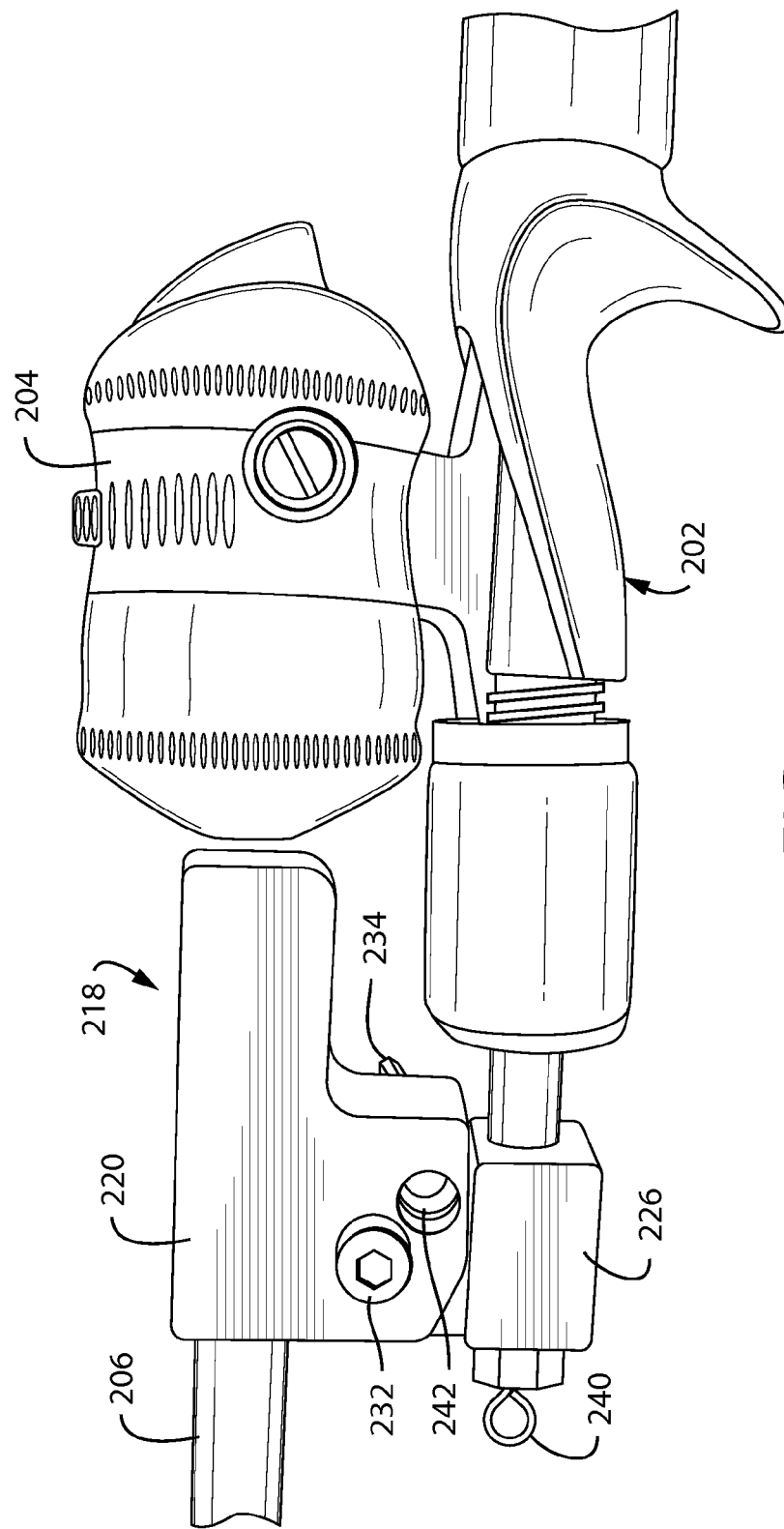
FIG. 5 is a partial side view that is the opposite side of the view shown in FIG. 4.
Figure 6:
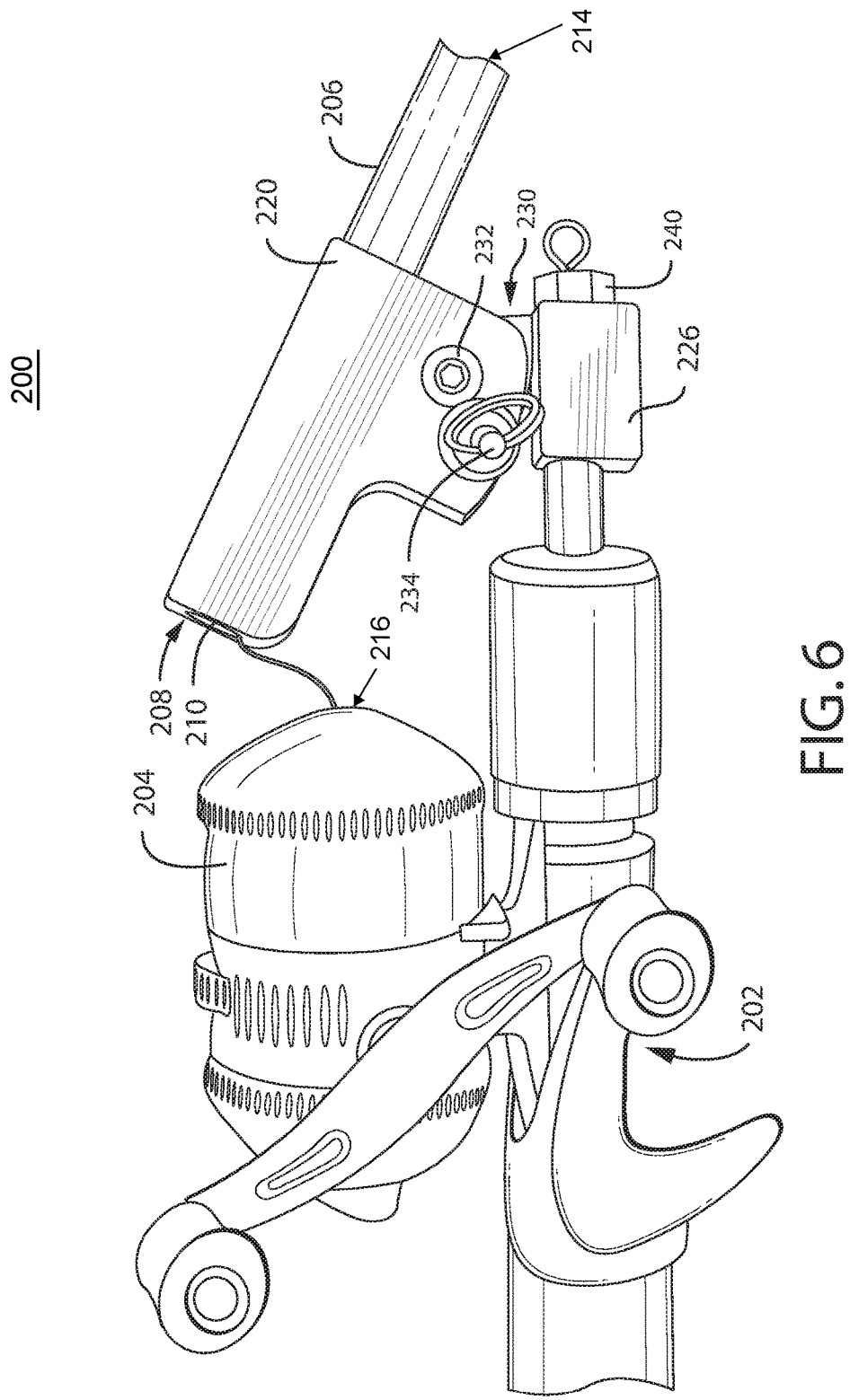
FIG. 6 is a partial side view of the inventive fishing rod as shown in FIG. 4 with a mounting bracket shown in a second orientation.
Figure 7:
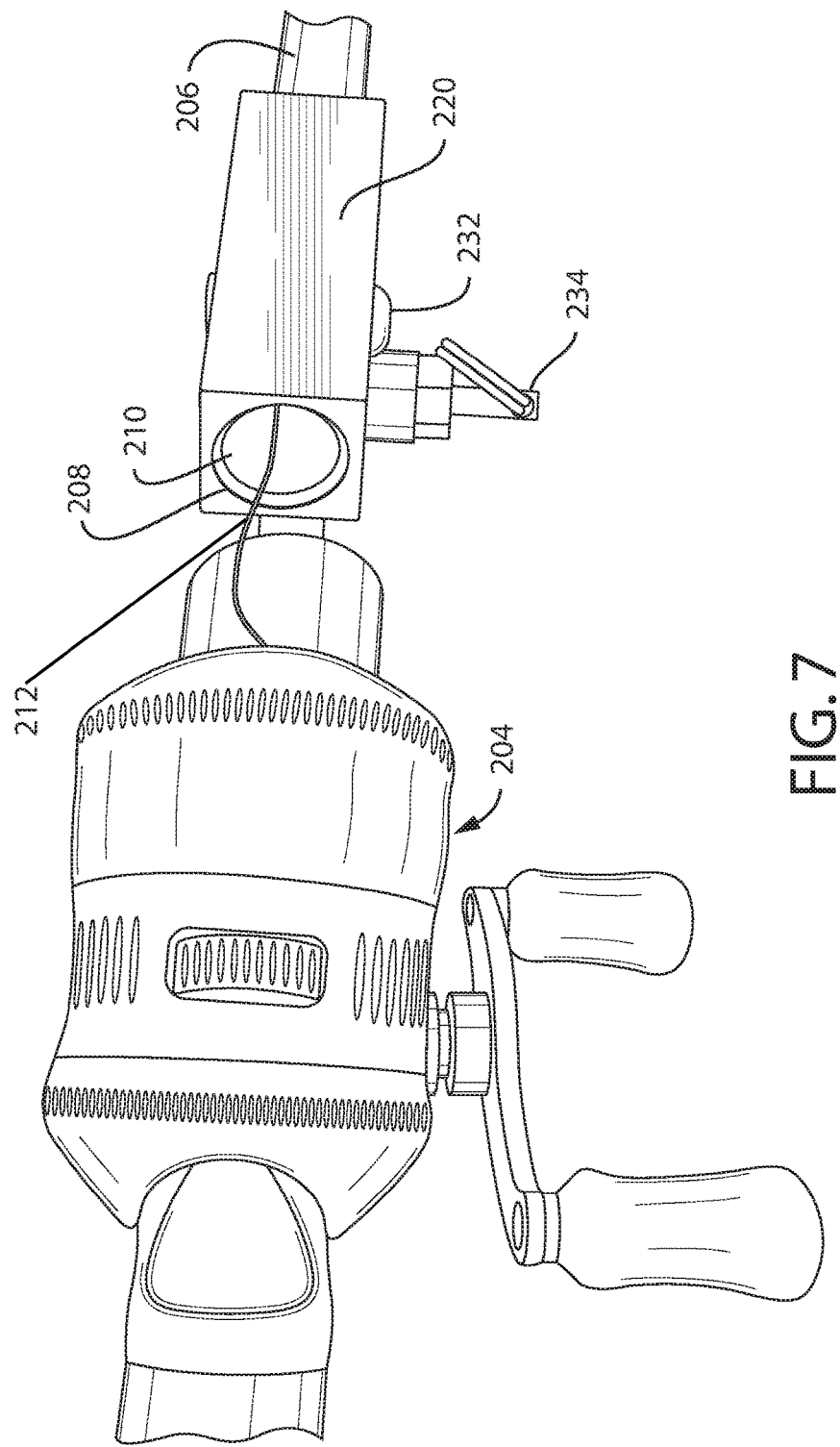
FIG. 7 is a partial top perspective view of the second embodiment of the inventive fishing rod.
Figure 8:
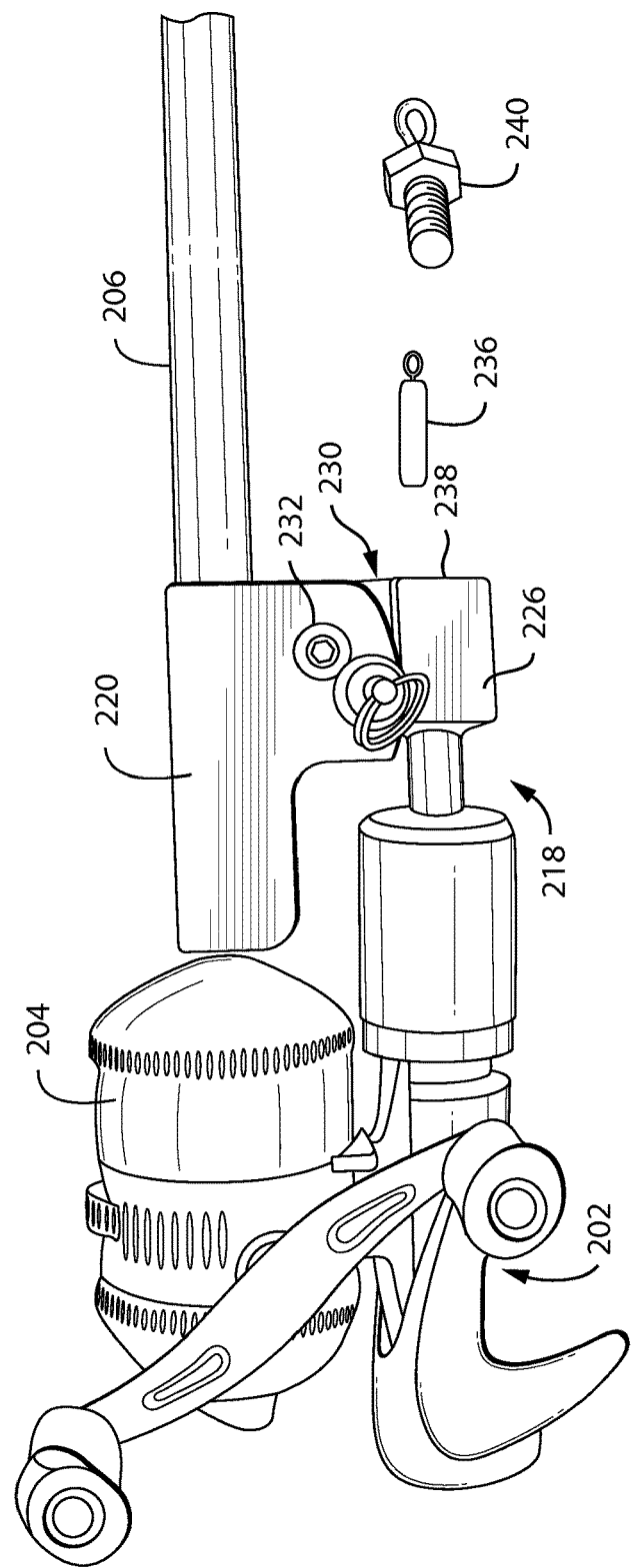
FIG. 8 is a partial exploded perspective view of the second embodiment of the inventive fishing rod.
Figure 9:
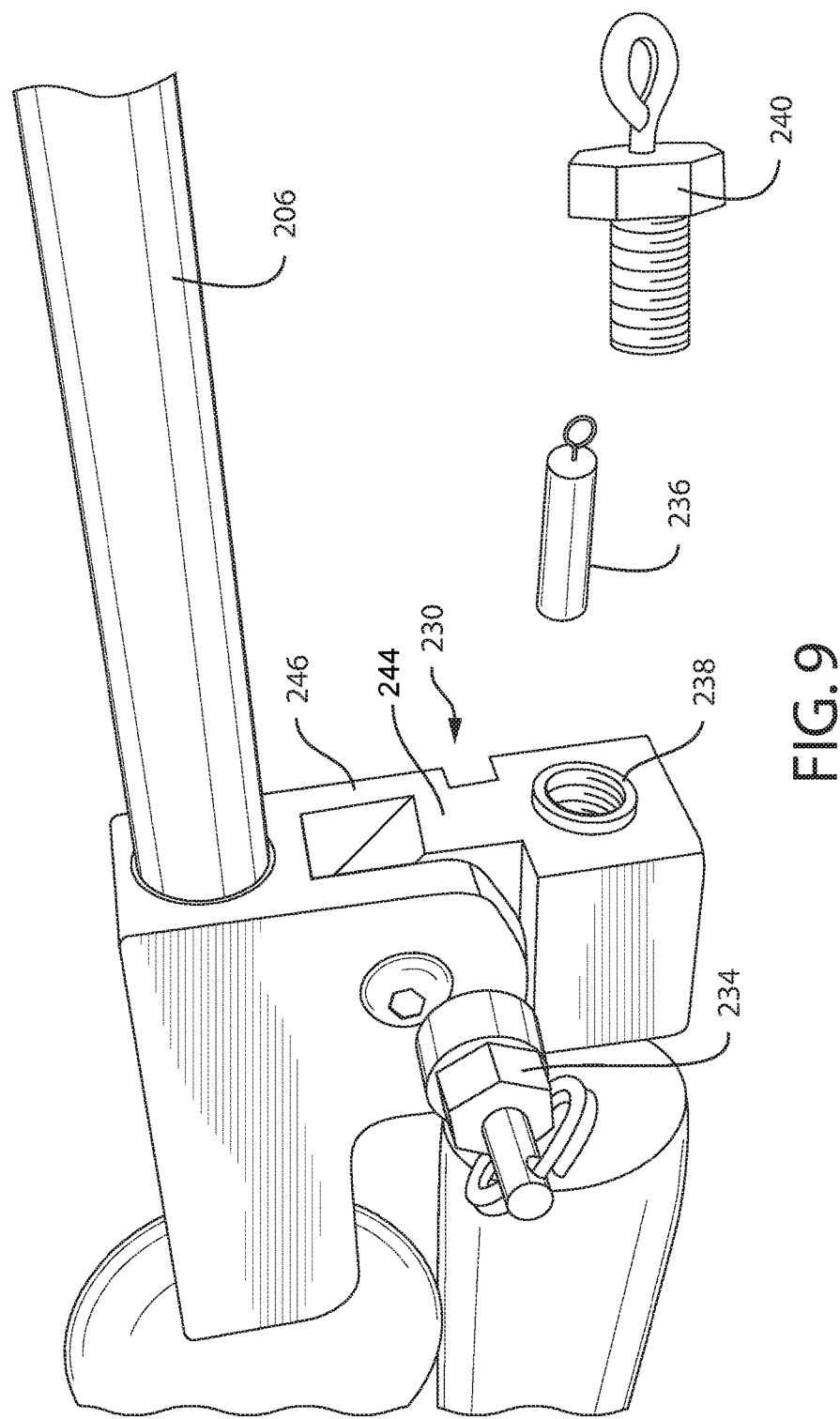
FIG. 9 is a second partial exploded perspective view of the first embodiment of the inventive fishing rod showing the mounting bracket assembly.

In a second preferred embodiment of the invention, as shown in FIGS. 4 through 9, the mounting bracket 218 is provided with a hinging mechanism 230. This embodiment has many of the same general features of the first embodiment. This embodiment includes a fishing rod assembly 200 that includes a reel seat 202 for mounting a fishing reel 204 and a hollow fishing rod 206. The rod 200 has a line opening 208, an inner core 210 and a line 214 exit spaced apart from the line opening 208. Fishing line 212 from the fishing reel 204 is passed through the core 210 of the hollow fishing rod 206. An offset mounting bracket 218, as best shown in FIGS. 4, 5 and 6, includes an upper rod mounting tube 220, a bridge 222 or middle portion of the bracket 218 and a lower reel seat mounting tube 226. The bridge 222 defines the spacing between the upper tube 220 and the lower tube 226. It is understood that the size of the bridge 222 can be changed to accommodate different rod and reel size combinations. The upper 220 and lower 226 mounting tubes may or may not be threaded to accommodate a variety of tubes and reel seats. Reel seats, such as the one shown in FIG. 2, are provided with threads 228 which are used to secure the reel 204 to the reel seat 202. Generally, the upper tube 220 would not be threaded so that a hollow fishing rod 206 can be mounted therein using an adhesive using methods common in the industry. The lower mounting tube 226 may or may not be threaded depending on the type of reel seat 202 being used. In this first embodiment the mounting bracket 218 is rigid and non-movable. When mounted in the reel seat 202, the reel 204 is generally in axial alignment with the rod 206 and specifically the line orifice 216 of the reel 204 is axially aligned with the core 210 of the rod 206 so that the fishing line 212 passes from the reel orifice 216 linearly into the core 210.

The mounting bracket 218 includes a hinging mechanism 230 that allows the fishing line opening of the rod 208 to be moved generally upward with respect to the fishing reel 204 as best shown in FIG. 6. The hinging mechanism 230 is preferred to be a simple pin through pivot hinge created by an upward projecting tang 244 on the bottom tube 226 and a mating hinge bracket 246 depending from the upper tube 220 and moveably mounted to the tang 244 with a through pin 232. A retention pin 234 is selectively engaged within a retention pin bore 242 (shown only in FIG. 5) to hold the hinge mechanism 230 in place. It is understood that other similar hinging mechanisms can be substituted for the hinging mechanism described herein without departing from the spirit and scope of this patent.

When actuated, the hinge mechanism 230 is similar to that found in breech loaded double barrel shotguns. To actuate the hinge mechanism 230 for access to the fishing line opening 208, the retention pin 234 is disengaged from the retention pin bore 242 which allows the hinge bracket 246 to pivot around the through pin 232. Movement of the hinge bracket 246 is limited by the size of the tang 244. This hinging operation allows easy access of the user to the fishing line opening 208 of the rod 206. This accommodates threading new or replacement line from the fishing reel 204 through the core 210 of the rod 206.

In one embodiment of the invention, a closeable compartment 238 is provided within the mounting block 218 to house a small fishing ling threading tool 236. The threading tool 236 may be a simple weight that is clamped onto the line or otherwise fastenable to the fishing line and then dropped through the core of the fishing rod. A closure 240 for the compartment 238 is provided. This closure 240 can be mateably threaded to threads in the compartment, or a friction fit plug or other suitable closing or stopping device.

Figure 10:
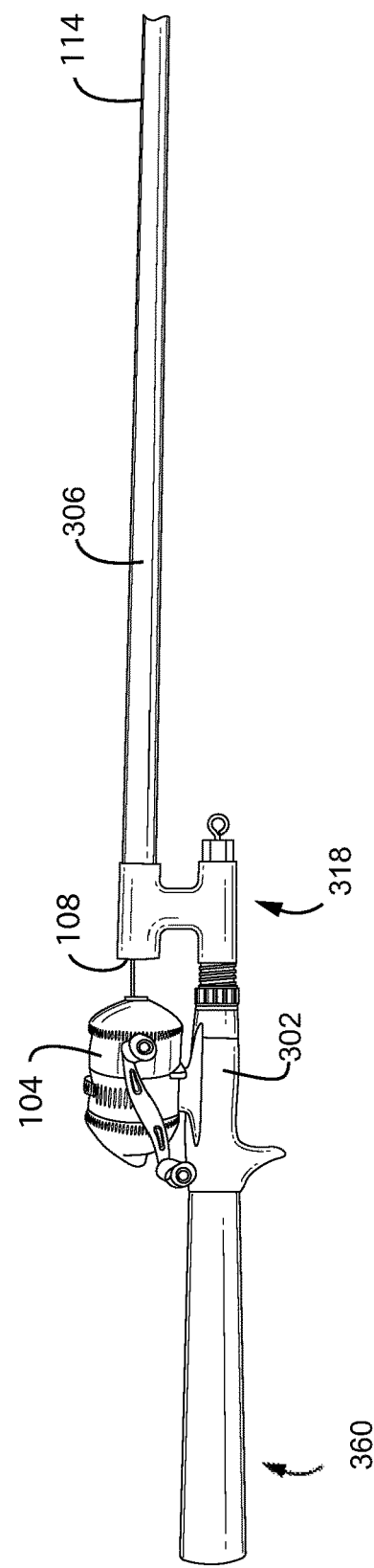
FIG. 10 is perspective view of one embodiment of the inventive device constructed with golf club shaft and grip handle.

In yet another embodiment of the inventive device, the hollow fishing rod 306 is made from a golf club shaft, preferably a hollow graphite shaft, as best shown in FIG. 10. Because a short rod length is desirable, particularly for use by children, a graphite golf shaft is the ideal dimension for application on the inventive device. The mounting bracket 318 can be sized to accommodate the graphite golf club shaft. Further, a golf club handle or grip 360 can easily be mounted to the fishing reel seat 302 and thereby substituted for the standard fishing rod handle.

The inner core of the fishing rod may be treated or coated with friction reduction material, such as Teflon, as previously disclosed by U.S. Pat. No. 5,381,619 to Watkins.

It will become apparent to those skilled in the art that many changes and substitutions can be made to the preferred embodiments herein described without departing from the spirit and scope of the present invention which is defined by the claims presented herein.

What is claimed is:
1. A fishing rod assembly for use with a fishing reel having a fishing line orifice, the fishing rod assembly comprising:
   a hollow fishing rod, the hollow fishing rod having a fishing line opening at a first end of the hollow fishing rod and a fishing line exit spaced apart from the fishing line opening at a second end of the hollow fishing rod; and
   a fishing reel seat, onto which the fishing reel is positioned a mounting bracket comprising:
      a top mounting tube into which the first end of the hollow fishing rod is directly mounted;
      a lower mounting tube having first and second lower mounting tube ends, the fishing reel seat attached to the first lower mounting tube end, a rod handle attached to the fishing reel seat wherein the rod handle is substantially aligned with the reel seat;
      a threaded plug disposed in a threaded opening of a closable compartment provided in the second lower mounting tube end; and or closing said closable compartment
      a hinge mechanism, the hinge mechanism pivotally connecting the lower mounting tube with the top mounting tube, the hinge mechanism positions the top mounting tube between first and second positional states with respect to the fishing line orifice, the first positional state positioning the top mounting tube such that the fishing line orifice of the fishing reel is axially aligned with the fishing line opening of the first end of the hollow fishing rod, and the second positional state positioning the top mounting tube such that the fishing line opening of the first end of the hollow fishing rod is pivoted away from the fishing line orifice; and wherein in the first positional state the lower mounting tube is parallel to the hollow fishing rod.

2. The fishing rod assembly of claim 1, wherein the hinge mechanism further comprises an upwardly sloping tang surface fixed to the lower mounting tube, a hinge bracket depending from the top mounting tube, and a through pin fixed through the tang and the hinge bracket about which the top mounting tube can be pivoted.

3. The fishing rod assembly of claim 1, further comprising a retention pin bore through the hinge mechanism of the mounting bracket and a retention pin moveably positioned within the retention pin bore such that when the retention pin is fully engaged within the retention pin bore, the hinge mechanism is prevented from pivoting and upon limited linear retraction of the retention pin the hinge mechanism is allowed to pivot.

4. The fishing rod assembly of claim 3, wherein the retention pin bore passes through an upwardly sloping tang surface of the lower mounting tube and a hinge bracket of the top mounting tube.

5. The fishing rod assembly of claim 1, wherein the threaded plug disposed in the threaded opening defines a threaded compartment in the lower mounting tube that is capable of housing a fishing line threading tool.

6. A fishing rod assembly for use with a fishing reel having a fishing line orifice, the fishing rod assembly comprising:
   a hollow fishing rod, the fishing rod having a fishing line opening at a first end of the hollow fishing rod, a fishing line exit spaced apart from the fishing line opening at a second end of the hollow fishing rod, and a core there-between configured to position a fishing line therethrough;
   a fishing reel seat, to which the fishing reel is attached; and
   a rod handle attached to a first end of the reel seat; a mounting bracket attached to a second end of the reel seat, the mounting bracket comprising:
      a top mounting tube into which the first end of the hollow fishing rod is directly mounted;
      a lower mounting tube having first and second lower mounting tube ends, the first lower mounting tube end into which the fishing reel seat is directly mounted at a first reel seat end thereof, the second lower mounting tube end having a threaded compartment closeable by a threaded plug; and
      a hinge mechanism, the hinge mechanism directly connecting the lower mounting tube with the top mounting tube, the hinge mechanism positions the top mounting tube into first and second positional states with respect to the fishing line orifice,
   the first positional state positioning the top mounting tube such that the fishing line orifice of the fishing reel is axially aligned with the fishing line opening of the first end of the hollow fishing rod, and
   the second positional state positioning the top mounting tube such that the fishing line opening of the first end of the hollow fishing rod is pivoted away from the fishing line orifice; and
   wherein in the first positional state the mounting tube is parallel to the hollow fishing rod; and
   wherein the rod handle, the reel seat, and the lower mounting tube are aligned.

7. A fishing rod assembly, for use with a fishing reel having a fishing line orifice, the fishing rod assembly comprising:
   a hollow fishing rod, having a fishing line opening at a first end of the hollow fishing rod and a fishing line exit at a second end of the hollow fishing rod, wherein the fishing line opening and the fishing line exit are connected by a hollow core of the rod;
   a mounting bracket comprising an upper tube, a lower tube, and a bridge, wherein the upper tube and the lower tube are spaced apart and parallel to each other along a lengthwise axis, and the bridge connects the upper tube to the lower tube in a fixed configuration; and
   a reel seat for receiving the fishing reel;
   wherein the upper tube has a hollow core;
   wherein the first end of the hollow fishing rod is directly attached to the upper tube so that the fishing line opening in the rod is in communication with the hollow core of the upper tube;
   wherein the lower tube has a first end and a second end, wherein the first end of the lower tube is attached to a first end of the reel seat;
   wherein a handle is attached to a second end of the reel seat, and the handle, the reel seat, and the lower mounting tube are aligned along a lengthwise axis;
   wherein the second end of the lower tube has a threaded compartment closable by a threaded plug; and
   wherein, when the fishing reel is attached to the reel seat, the fishing line orifice of the fishing reel is aligned with the lengthwise axis of the upper tube and the hollow core of the fishing rod.

* * * * *